United States Patent [19]
Schill et al.

[11] Patent Number: 5,884,357
[45] Date of Patent: Mar. 23, 1999

[54] FOUR-JOINT WIPER ARM FOR A WINDSHIELD WIPER SYSTEM OF A MOTOR VEHICLE

[75] Inventors: Eduard Schill, Wiernsheim; Michael Grossmann, Grosssachsenheim, both of Germany

[73] Assignee: ITT Manufacturing Enterprises Inc., Wilmington, Del.

[21] Appl. No.: 817,373

[22] PCT Filed: Sep. 26, 1995

[86] PCT No.: PCT/EP95/03804

§ 371 Date: Jun. 2, 1997

§ 102(e) Date: Jun. 2, 1997

[87] PCT Pub. No.: WO96/11824

PCT Pub. Date: Apr. 25, 1996

[30] Foreign Application Priority Data

Oct. 12, 1994 [DE] Germany .......................... 44 36 373.9

[51] Int. Cl.⁶ .................. B60S 1/06; B60S 1/24; B60S 1/34
[52] U.S. Cl. ...................... 15/250.21; 15/250.31
[58] Field of Search ............ 15/250.21, 250.23, 15/250.31, 250.3, 250.34, 250.13

[56] References Cited

U.S. PATENT DOCUMENTS

| 4,535,500 | 8/1985 | Verton et al. ................. 15/250.23 |
| 4,546,518 | 10/1985 | Harbison et al. ............... 15/250.23 |
| 4,720,885 | 1/1988 | Leroy et al. .................. 15/250.21 |
| 4,912,802 | 4/1990 | Raymond ...................... 15/250.23 |
| 4,918,780 | 4/1990 | Scorsiroli ..................... 15/250.21 |

FOREIGN PATENT DOCUMENTS

| 203886 | 6/1959 | Austria ......................... 15/250.3 |
| 0182123 | 5/1986 | European Pat. Off. . |
| 0537059 | 4/1993 | European Pat. Off. . |
| 1105 743 | 4/1961 | Germany ....................... 15/250.21 |
| 2215335 | 11/1973 | Germany . |
| 3344956 | 6/1985 | Germany . |
| 1381818 | 1/1975 | United Kingdom ............ 15/250.23 |
| WO96/11824 | 4/1996 | WIPO . |

Primary Examiner—Gary K. Graham
Attorney, Agent, or Firm—J. Gordon Lewis; Thomas N. Twomey

[57] ABSTRACT

The invention relates to a four-joint wiper arm for a windshield wiper system of a motor vehicle, with the so-called four-joint consisting of a primary lever that can be connected to the primary shaft, a control lever arranged lateral to the former, that can be connected to a supporting arbor and a coupling link connected by means of one joint respectively to the free ends of primary lever and control lever. At the end at which the control lever is coupled, the joint section of the wiper arm is pivoted to the coupling link in a conventional way. In order to preclude distortion in the four-joint assembly and thereby improve the wiping quality, one of the two joints is in the form of a ball-and-socket joint between the coupling link and primary lever or control lever and the other is in the form of a universal joint.

11 Claims, 2 Drawing Sheets

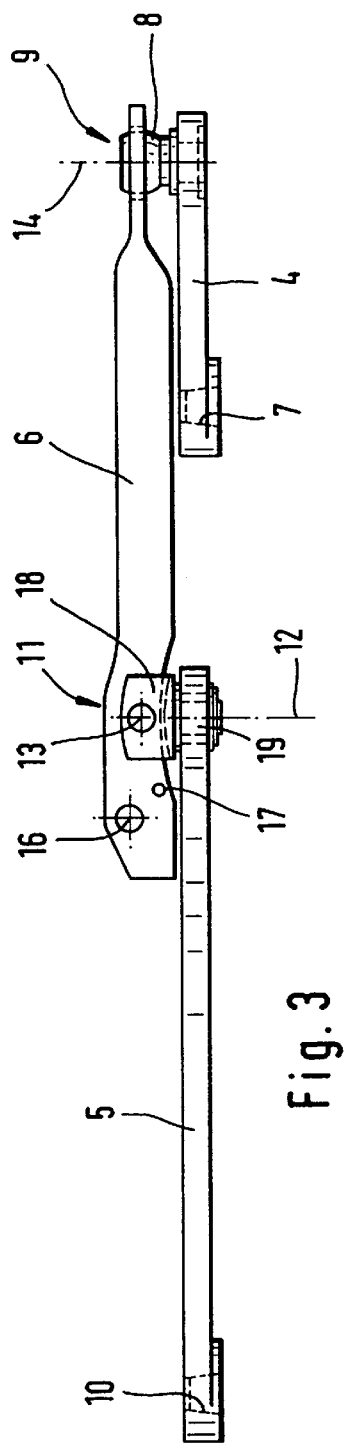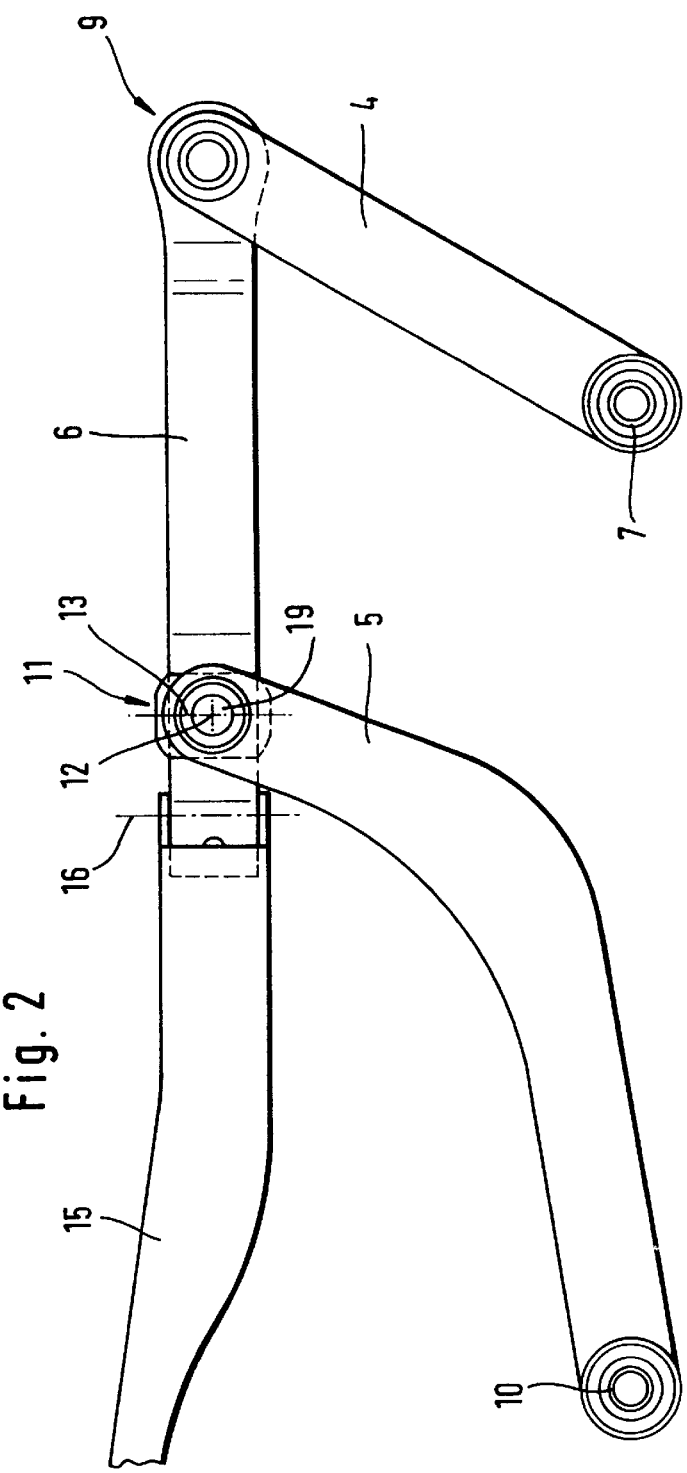

FOUR-JOINT WIPER ARM FOR A WINDSHIELD WIPER SYSTEM OF A MOTOR VEHICLE

BACKGROUND OF THE INVENTION

The invention relates to a four-joint wiper arm for a windshield wiper system of a motor vehicle, with one joint formed between a primary shaft and a primary connecting rod, an additional joint formed between the primary lever and a coupling link, an additional joint formed between the coupling link and a supporting rod and an additional joint formed between the control lever and a supporting arbor.

Four-joint wiper arms of this type, for which the curved wiping movement of the wiper blade on the windshield is combined with an additional lifting movement in the longitudinal direction of the wiper blade, are known, e.g., from DE 4,214,679 A1 or EP 0,537,059 A1. In both cases, both the primary lever as well as the control lever are connected to the coupling link by means of a respective one arbor, with both arbors running parallel to each other and perpendicular to the pendulum plane of the coupling link. It is known that the wiper blade must be pressed against the windshield to be wiped with a force great enough to achieve a good wiping quality. The pressure force of the wiper blade is produced by means of a prestressed tension spring, the ends of which are secured to the wiper rod or joint section, on one hand, and to the coupling link, on the other hand, in such a way that the joint section with wiper arm, which is sealed on the coupling link so as to pivot, is moved relative to the coupling link in the direction of the windshield.

Upon contact of the wiper blade against the windshield, a tension produced by spring tension force is transmitted by the pivot bearing between joint section and coupling link into the four-joint assembly. This leads to distortion between the parts of the four-joint assembly, especially in the four pivot bearings. This stress leads, in turn, to an obstruction of the wiping movement, lessening the wiped quality. Distortion in the four-joint assembly also occurs, more specifically, if the four aforementioned joint locations are not mutually aligned with sufficient precision, which can be caused by manufacturing tolerances alone.

SUMMARY OF THE INVENTION

The purpose of the invention is to improve a four-joint wiper arm of the aforementioned type in such a way that the wiping movements can be carried out without obstruction.

In accordance with the invention, the problem is solved by means of a four-joint wiper arm for a windshield wiper system of a motor vehicle, for which a wiping movement on a wind shield is combined with an additional stroke movement in a longitudinal direction, for which one of the two joints between a coupling link and a primary lever or a control lever is in the form of a ball-and-socket joint and the other joint is in the form of a universal joint. This equips said joints with an additional degree of freedom of movement that, on one hand, enables the four-joint assembly wiper arm to be fastened in a statically defined way and, on the other hand, does not permit the distortion from occurring in the four-arm that has been described as a disadvantage. Henceforth, the wiping movement can be freed from the distortion of the four-joint assembly that has been described as a disadvantage and consequently carried out without obstruction, leading to a considerable improvement of the wiped quality.

A four-joint wiper arm is recommended as particularly advantageous, with respect to uniformity and ease of wiping movements, for which, the joint provided between the coupling link and primary lever is in the form of a ball-and-socket joint and the joint provided between the coupling link and control lever is in the form of a universal joint. This execution is distinguished by a precise guiding of the wiper arm during the wiping movements.

An embodiment in which the ball-and-socket joint is formed by a simple ball pin and associated ball cup, with the ball pin being fastened to the primary lever and the ball cup to the coupling link is regarded as a simple ball-and-socket joint between the coupling link and primary lever.

An advantageous configuration of the universal joint is recommended, according to which the first pivot axis of said universal joint takes a path at right angles to the pivot plane of the coupling link and the second pivot axis of the universal joint takes a path in the pivot plane of the coupling link and, consequently, transverse to the longitudinal axis of the coupling link. In addition to said features, the center axis of the ball pin of the ball-and-socket joint should advantageously take a path parallel to the first pivot axis of the universal joint. This type of arrangement of the pivot axes achieves a particular ease of operation of the four-joint assembly, such that the drive of the windshield wiper system has to transmit substantially less force to the primary lever of the four-joint assembly wiper arm.

A very simple construction of the universal joint is characterized, by the fact that the universal joint has a forked pin, which features a bearing journal and two fork legs, with the bearing journal forming the first pivot axis and the second pivot axis of the universal joint taking a path through the two fork legs, at right angles to the bearing journal.

A simple assembly of the universal joint is provided if, in accordance with claim 7, the bearing journal of the forked pin is pivoted on the control lever and the coupling link is pivoted about the second pivot axis between the fork legs of the pin. In addition, it is favorable if, in accordance with claim 8, the second pivot axis of the universal joint is formed by a pin arranged in aligned holes that are provided in the fork legs of the pin and in the coupling link. If, in addition, at least one end of the pin forming the second pivot axis is fixed to a fork leg and is pivoted in the drilled hole of the coupling link, preferably in a sleeve inserted in the drilled hole of the coupling link, then this is advantageous for the wear behavior of said pivot bearing. In addition, this results in favorable assembly possibilities in such a way that at least one end of the pin can be very simply pressed into a correspondingly narrow drilled hole of a fork leg.

In order to achieve a favorable lateral guidance between the forked pins of the universal joint and the coupling joint, an embodiment is recommended, according to which the inner sides of the fork legs of the pin are in the form of lateral guides and, accordingly, cooperate with the relevant outer sides of the coupling link.

With the aid of figures, the invention is described in greater detail in the following.

BRIEF DESCRIPTION OF THE DRAWINGS

Shown are:

FIG. 2: A four-joint wiper arm as seen by the driver, FIG. 3: A top view of the four-joint assembly wiper arm from FIG. 2, but without joint section.

DETAILED DESCRIPTION OF THE DRAWINGS

Figure 1:
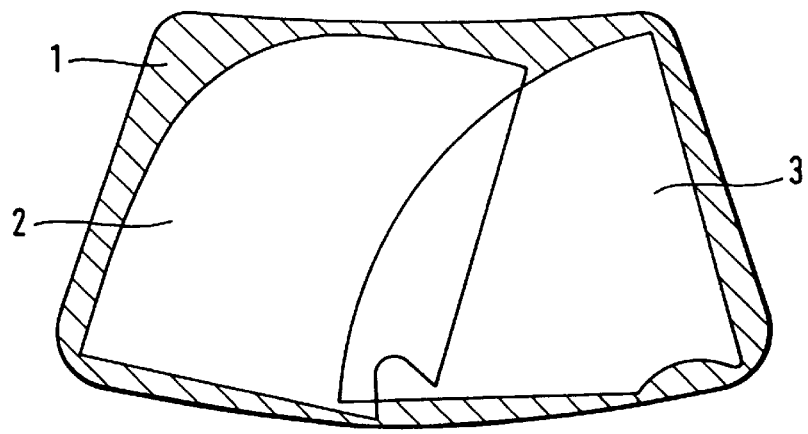
FIG. 1: A schematic representation of the wipe field as seen by the driver, with the use of a four-joint wiper arm and a conventional wiper arm.

On the windshield of a motor vehicle as shown schematically in FIG. 1, the left wiper field (2), produced by means of a four-joint wiper arm in accordance with the invention, can be recognized, as can the right wiper field (3), produced by a conventional wiper arm. It is evident from the contour lines of the wiper field (2), that the four-joint assembly wiper arm executes not only a pivoted movement about a wiper shaft, but also an additional combined stroke movement. This movement of the wiper arm and, consequently, of its wiper blade, not represented, is achieved with the aid of a so-called four-joint.

The construction of such a four-joint is evident from FIGS. 2 and 3. Its essential components are a primary lever (4), control lever (5) and coupling link (6). One end of the primary lever (4) possesses a conical receiver (7), by means of which the former is connected, secure against pivoting, to a primary shaft, not represented, which in turn, is arranged in a bearing fixed to the car body. The position of the primary shaft fixed to the car body corresponds to the position of the receiver (7) represented in FIGS. 2 and 3. At the end located opposite the receiver (7), a ball pin (8) is fastened to the primary lever (4) such that its center axis passes at right angles to the primary lever (4) and, consequently, is also at right angles to the pivot plane of the coupling link (6). A ball cup that, with respect to the figures, is fastened to the right end of the coupling link (6), is slipped over the ball pin (8). Consequently, the ball-and-socket joint (9) is formed between the primary lever (4) and coupling link (6).

The angled control lever (5) is arranged next to the primary lever (4) with a lateral clearance. One end of the control lever (5) is provided with a conical receiver (10), by means of which it can be connected, secure against pivoting, to a supporting arbor that, likewise, is arranged in a support fixed to the car body. The stationary position of the rotating supporting arbor agrees with the position of the receiver (10) in FIGS. 2 and 3. The end of the control lever (5) located opposite the receiver (10) is coupled to the coupling link (6) by means of a universal joint (11). The location where the control lever (5) is coupled to the coupling link (6) is located near the end of the coupling link opposite the ball-and-socket joint (9). It is clearly evident from FIGS. 3 and 4 that a first pivot axis (12) of the universal joint (11) passes at right angles to the pivot plane of the coupling link (6) and a second pivot axis (13) of the universal link (11) passes a path in the pivot plane of the coupling link (6) and, in this connection, transverse to the coupling link (6). In addition, the first pivot axis (12) of the universal joint (11) passes parallel to the center axis (14) of the ball pin (8).

At the end adjacent to the universal joint (11), a joint section (15) (FIG. 2) is coupled to the coupling link (6) such that it pivots about the pivot axis (16). The pivot axis (16) likewise, passes in the pivot plane of the coupling link (6) and, in this connection, transverse to the coupling link (6). This guarantees an ability of the joint section (15) to pivot with the wiper bar, not represented, and the wiper blade coupled thereto, likewise not represented, in the direction of the windshield (1) to be wiped. Also, the hanging point (17) for the pressure spring in the form of a tension spring, likewise not represented, is evident from FIG. 3. Also, not represented is a conventional motor impacting a swinging motion to the primary lever (4) and the control lever (5) and thus providing the wiping and stroke movements of the whole structure described therein.

Since the structural design of joint section, wiper bar, wiper blade and pressure spring, as well as the arrangement and fasting of the same are generally known, this does not need to be explained in greater detail.

Figure 4:
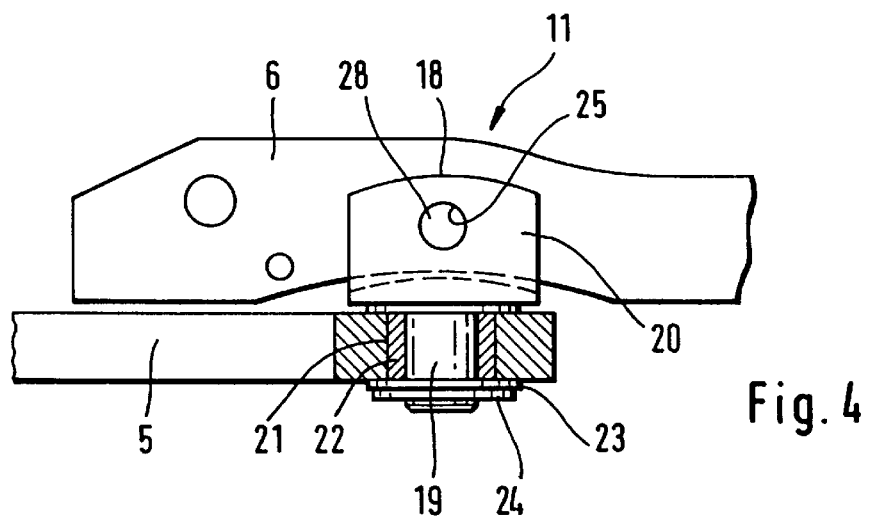
FIG. 4: An enlarged cutout from FIG. 3, showing the universal joint.
Figure 5:
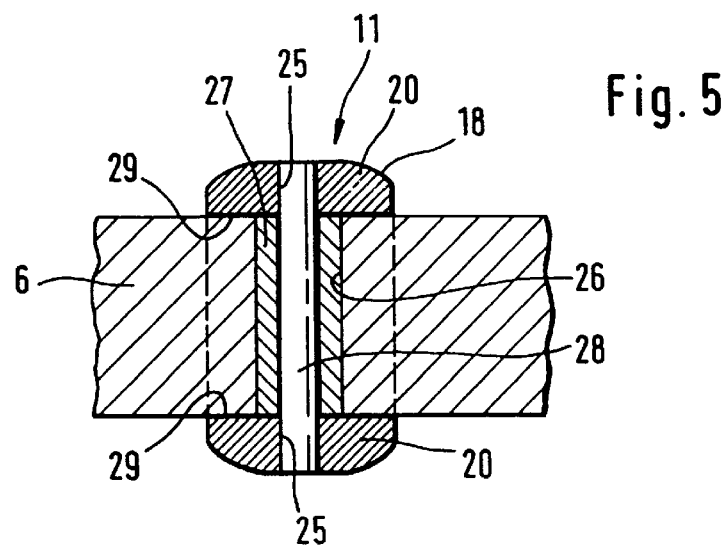
FIG. 5: A top view of FIG. 4, represented in section.

The design of the universal joint (11) is more clearly evident from FIG. 4 and 5. The universal joint (11) has a forked connector (18) that consists of a cylindrical pivot pin (19) and two parallel fork legs (20). The pivot pin (19) is pivoted to the control lever (5). For this purpose, the control lever (5) possesses a corresponding drilled through-hole (21) in which is inserted a bearing sleeve (22).

The free end of the pivot pin (19) passes through the bearing sleeve (22) and is held axially onto the control lever by means of a washer (23) and locking ring (24) fixed below this in a peripheral annular groove on the control lever (5). Aligned drilled holes (25), that run concentric to the second pivot axis (13) of the universal joint, pass through the fork legs (20). A drilled through-hole (26) transversely, in which is arranged a bearing sleeve (27), likewise passes through the coupling link (6). The coupling link (6) is arranged between the fork legs (20) of the pin (18) such that the passage opening of the bearing sleeve (27) is aligned with the drilled holes (25) in the lateral legs (20). A pin (28) is inserted in the drilled holes (25) and simultaneously in the bearing sleeve (27). The pin (28) and the drilled holes (25) in the lateral legs (20) are coordinated such that the pin (28) assumes a press fit in the drilled holes (25) and, consequently, is held to the lateral legs (20), secure against pivoting. The pin (28) is pivoted in the bearing sleeve (27) of the coupling link (6). In order to improve the lateral guiding of the coupling link (6), the inner sides (29) of the fork legs (20) are in the form of a bearing surface with respect to the outer sides of the coupling link (6).

The ball-and-socket joint (9) provides for a spatial freedom of movement between the primary lever (4) and coupling link (6). Apart from a rotation about the center axis (14) of the ball-and-socket joint, additional swinging is possible between the coupling link (6) and primary lever (4). The universal joint (11) likewise enables an additional degree of freedom of movement perpendicular to the pivot plane of the coupling link (6). Thus, an additional pivoting of the coupling link (6) about a second pivot axis (13) is made possible apart from the necessary slewing motion about the first pivot axis (12). Despite this, the arrangement of the second pivot axis (13) in the pivot plane of the coupling link (6) and this transverse to the longitudinal direction of the coupling link (6), guarantees the maintenance of the desired angle between the wiper blade and the windshield (1), 90° in a normal case. Together the ball-and-socket joint (9) and universal joint (11) avoid the damaging distortion in the four-joint assembly mechanism caused by means of the additional degree of freedom of movement. As a result, an easy and uniform course of movement of the four-joint assembly wiper arm is guaranteed during its operation, by means of which a better wipening quality is achieved. In addition, the wear behavior is clearly improved, particularly in the four-joint assemblies, due to the absence of distortion in the four-joint assembly mechanism by means of which, on one hand, the life of the windshield wiper system is lengthened and, on the other hand, a good wiping quality is preserved over a substantially longer period of time.

In conclusion, it must still be noted that the invention is not limited to the embodiment represented in the figures. Likewise, good results can be achieved if the universal joint (11) is provided between the primary lever (4) and coupling link (6) and the ball-and-socket joint (9) is provided between the control lever (5) and the coupling link (6). Also, other advantageous configurations of the universal joint (11) are conceivable apart from the embodiment represented in FIGS. 4 and 5.

We claim:

1. A four-joint wiper arm for a windshield wiper system of a motor vehicle, for which a wiping movement of an elongated wiper blade supported thereby on a windshield is combined with an additional stroke movement in a longitudinal direction of said wiper blade, with the wiper arm comprising a primary lever, a control lever, positioned neighboring the primary lever and with a lateral clearance thereto, the primary lever and the control lever running perpendicular to a pendulum plane of the wiper arm, a coupling link connected by means of two joints to free ends of the primary lever and control lever, respectively, and a joint section pivotally supported by the coupling link per pivotal movement about a pivot axis said section adopted to move about the pendulum plane of the wiper arm, said joint section for supporting blade, whereby a combined wiping and longitudinal stroke movement of the wiper blade is provided, wherein one of the two joints between the coupling link and the primary lever, on one hand, and between the coupling link and the control lever, on the other hand is a ball-and-socket joint and the other is a form of a universal joint.

2. The four-joint wiper arm of claim 1, wherein the joint between the coupling link and the primary lever is a ball-and-socket joint and the joint between the coupling link and the control lever is a universal joint.

3. The four-joint wiper arm of claim 2, wherein the ball-and-socket joint is formed by a ball pin and a ball cup, with the ball pin fastened to the primary lever and the ball cup fastened to an end of the coupling link opposite the joint section.

4. The four-joint wiper arm of claim 3, wherein a center axis of the ball pin passes parallel to a first pivot axis of the universal joint.

5. The four-joint wiper arm of claim 1, wherein a first pivot axis of the universal joint passes at right angles to the pivot plane of the coupling link and a second pivot axis of the universal joint passes in the pivot plane of the coupling link and transverse to the longitudinal axis of the coupling link.

6. The four-joint wiper arm of claim 1, wherein the universal joint has a forked connector comprising a first pivot pin that forms a first pivot axis and two fork legs, through which a second pivot axis passes at right angles to the first pivot pin.

7. The four-joint wiper arm of claim 6, wherein the first pivot pin of the forked connector, is pivoted on the control lever and in that the coupling link is pivoted between the fork legs of the connector about the second pivot axis.

8. The four-joint wiper arm of claim 6, wherein the second pivot axis of the universal joint is formed by a second pin, that is provided in aligned drilled holes in the fork legs of the forked connector and in the coupling link.

9. The four-joint wiper arm of claim 8, wherein at least one end of the second pin is fixed to a fork leg and pivoted in a bearing sleeve inserted in the drilled hole of the coupling link.

10. The four-joint wiper arm of claim 6, wherein inner sides of the fork legs of the connector are formed as lateral guides and accordingly cooperate with relevant outer sides of the coupling link.

11. A four-joint wiper arm for a windshield wiper system of a motor vehicle, for which a wiping movement of elongated wiper blade support thereby on a windshield is combined with an additional stroke movement in a longitudinal direction of said wiper blade, with the wiper arm comprising a primary lever, a control lever, positioned neighboring the primary lever and with a lateral clearance thereto, the primary lever and the control lever running perpendicular to a pendulum plane of the wiper arm a coupling link connected by means of two joints to free ends of the primary lever and control lever, respectively, and a joint section pivotally supported by the coupling link for pivotal movement about a pivot axis said section adopted to move about the pendulum plane of the wiper arm, said joint section for supporting said blade, whereby a combined wiping and longitudinal stroke movement of the wiper blade is provided.

wherein one of the two joints between the coupling link and the primary lever, on one hand, and between the coupling ink and the control lever, on the other hand, is a a ball-and-socket joint and the other is form of a universal joint which has a forked connector with a pivot pin that forms a first pivot axis and two fork legs, through which a second pivot axis passes at right angles to the pivot pin and is formed by a pin, that is provided in aligned drilled holes in the fork legs of the forked pin and in the coupling link, wherein at least one end of the pin is fixed to a fork leg and pivoted in the drilled hole of the coupling link.

* * * * *